US009553658B1

(12) United States Patent
Bantoft et al.

(10) Patent No.: US 9,553,658 B1
(45) Date of Patent: Jan. 24, 2017

(54) ROUTER FOR AIRCRAFT COMMUNICATIONS WITH SIMULTANEOUS SATELLITE CONNECTIONS (71) Applicant: Satcom Direct, Inc., Satellite Beach, FL (US)

(72) Inventors: Ken Bantoft, Melbourne, FL (US); Curt Gray, Glendale, AZ (US)

(73) Assignee: Satcom Direct, Inc., Melbourne, FL (US)

( * ) Notice: Subject to any disclaimer, the term of this patent is extended or adjusted under 35 U.S.C. 154(b) by 114 days.

(21) Appl. No.: 14/259,588

(22) Filed: Apr. 23, 2014

Related U.S. Application Data (60) Provisional application No. 61/892,672, filed on Oct. 18, 2013, provisional application No. 61/888,574, filed on Oct. 9, 2013, provisional application No. 61/888,593, filed on Oct. 9, 2013, provisional application No. 61/889,183, filed on Oct. 10, 2013.

(51) Int. Cl.
*H04B 7/185* (2006.01)
(52) U.S. Cl.
CPC ................. *H04B 7/18508* (2013.01)
(58) Field of Classification Search
USPC .......... 370/316, 328, 338, 401, 465
See application file for complete search history.

(56) References Cited

U.S. PATENT DOCUMENTS

| | | |
|---|---|---|
| 5,493,309 A | 2/1996 | Bjornholt |
| 5,937,349 A | 8/1999 | Andresen |
| 5,959,560 A | 9/1999 | Said |
| 6,014,606 A | 1/2000 | Tu |
| 6,151,497 A | 11/2000 | Yee |
| 6,201,797 B1 | 3/2001 | Leuca |
| 6,400,945 B1 | 6/2002 | Jensen et al. |

(Continued)

FOREIGN PATENT DOCUMENTS

WO    2007134498    11/2007

OTHER PUBLICATIONS

Marpe, et al, A Two-Layered Wavelet-Based Algorithm for Efficient Lossless and Lossy Image Compression, IEEE Transactions on Circuits and Systems for Video Technology, 2000, pp. 1094-1102, vol. 10, No. 7.

(Continued)

*Primary Examiner* — Ricky Ngo
*Assistant Examiner* — Christine Ng
(74) *Attorney, Agent, or Firm* — Brian S. Steinberger; Law Offices of Brian S. Steinberger, P.A.

(57) ABSTRACT

Methods, devices, routers and systems for a satellite-ready Satcom Direct router with simultaneous use of Inmarsat, SwiftBroadband, Swift 64, Ku-Band and Ka-Band satellite connections with intelligent traffic control, along with Wi-Fi access and 3G/4G cellular network connectivity. The router is compatible with existing Wi-Fi access points and is backward-compatible with 802.11b/g. Up to four or more simultaneous wireless networks can be supported, allowing multiple systems to operate on aircraft without additional wireless access points and providing 3G/4G network connectivity when the aircraft is on the ground. A downloadable Satcom Direct router mobile App provides on-board cabin services including one or more of moving maps, flight tracker and command and control of satellite links.

20 Claims, 8 Drawing Sheets

(56) References Cited

U.S. PATENT DOCUMENTS

| | | |
|---|---|---|
| 6,741,841 B1 | 5/2004 | Mitchell |
| 6,781,968 B1 | 8/2004 | Colella |
| 6,892,069 B1 | 5/2005 | Flynn |
| 6,954,794 B2 | 10/2005 | Rudd |
| 6,970,704 B2 | 11/2005 | Jensen et al. |
| 6,978,128 B1 | 12/2005 | Raman |
| 7,023,365 B1 | 4/2006 | Mitchell |
| 7,027,898 B1 | 4/2006 | Leger et al. |
| 7,177,939 B2 | 2/2007 | Nelson et al. |
| 7,209,978 B2 | 4/2007 | Thubert |
| 7,436,762 B2 | 10/2008 | Oka |
| 7,660,579 B2 | 2/2010 | Jensen |
| 7,761,793 B1 | 7/2010 | Mitchell |
| 7,852,819 B2 | 12/2010 | Gil |
| 8,305,936 B2 | 11/2012 | Wang |
| 8,339,991 B2 | 12/2012 | Biswas |
| 8,432,808 B1* | 4/2013 | Dankberg ............ H04L 67/325 370/235 |
| 8,477,771 B2 | 7/2013 | Biswas |
| 8,527,662 B2 | 9/2013 | Biswas |
| 9,008,868 B1 | 4/2015 | Bantoft et al. |
| 9,318,024 B1 | 4/2016 | Natwick et al. |
| 2003/0055975 A1* | 3/2003 | Nelson ............... H04B 7/18506 709/227 |
| 2003/0123481 A1 | 7/2003 | Neale |
| 2004/0064588 A1 | 4/2004 | Jungck |
| 2005/0041859 A1 | 2/2005 | Nguyen |
| 2005/0053026 A1* | 3/2005 | Mullan ............... H04B 7/18508 370/316 |
| 2005/0083358 A1 | 4/2005 | Lapstun |
| 2005/0177647 A1 | 8/2005 | Anantha |
| 2005/0215238 A1 | 9/2005 | Macaluso |
| 2005/0215249 A1 | 9/2005 | Little |
| 2005/0220055 A1 | 10/2005 | Nelson |
| 2005/0244060 A1 | 11/2005 | Nagarajan |
| 2006/0013264 A1* | 1/2006 | Eichler .................. H04L 47/10 370/522 |
| 2006/0092897 A1 | 5/2006 | Pirila |
| 2006/0115164 A1 | 6/2006 | Cooley |
| 2006/0156357 A1* | 7/2006 | Lockridge .......... H04N 7/17318 725/90 |
| 2006/0293049 A1 | 12/2006 | Jensen |
| 2007/0123290 A1 | 5/2007 | Stenmark |
| 2008/0182573 A1 | 7/2008 | Lauer |
| 2009/0023403 A1* | 1/2009 | LaBerge ............... H04B 15/02 455/114.2 |
| 2009/0109849 A1 | 4/2009 | Wood |
| 2009/0304096 A1* | 12/2009 | Khattab ............... H04B 7/0413 375/260 |
| 2010/0035607 A1* | 2/2010 | Horr ................. H04B 7/18508 455/428 |
| 2010/0279698 A1* | 11/2010 | Wong .................... H04W 88/06 455/450 |
| 2011/0046842 A1 | 2/2011 | Smith |
| 2011/0063980 A1 | 3/2011 | Kondo |
| 2011/0149849 A1* | 6/2011 | Brownrig ............... H04L 45/00 370/328 |
| 2011/0255506 A1* | 10/2011 | Toth ................... H04B 7/18506 370/331 |
| 2012/0033851 A1* | 2/2012 | Chen .................... G06T 7/0002 382/100 |
| 2012/0083971 A1 | 4/2012 | Preston |
| 2012/0109447 A1 | 5/2012 | Yousefi et al. |
| 2012/0232791 A1* | 9/2012 | Sterkel .................. H04H 20/62 701/454 |
| 2012/0303826 A1 | 11/2012 | Nelson |
| 2013/0103786 A1 | 4/2013 | Miglore |
| 2013/0120166 A1* | 5/2013 | Kommuri ............ G08G 5/0013 340/971 |
| 2013/0158821 A1 | 6/2013 | Ricci |
| 2013/0235728 A1 | 9/2013 | Le |
| 2013/0297103 A1 | 11/2013 | Baker et al. |
| 2014/0045520 A1* | 2/2014 | Lim ..................... H04W 4/023 455/456.1 |
| 2014/0137162 A1* | 5/2014 | McNamee ......... H04N 21/2187 725/63 |

OTHER PUBLICATIONS

Linux man page, gzip, gunzip, zcat—compress or expand files, 2002, 7 pages.

Rockwell Collins, EBACE 2012 Press Kit, retrieved on Oct. 4, 2013, retrieved from http://www.rockwellcollins.com/sitecore/content/Data/News/2012_2012_Yr/CS/FY12CSN, 2 pages.

Vandel, et al., Head-Up Guidance System Technology—A Clear Path to Increasing Flight Safety, Flight Safety Foundation, 2009, 29 pages.

Rockwell Collins, Ascend Mobile Applications, 2012, 2 pages.

Rockwell Collins, Falcon Cabin HD, Elevate your flight experience, 2012, 12 pages.

Rockwell Collins, Pro Line Fusion Advanced Avionics, 2011, 8 pages.

Rockwell Collins, Venue High-Definition Cabin Management System, 2012, 12 pages.

Rockwell Collins, Rockwell Collins to provide advanced cabin management and HD entertainment system for Falcon 7X and Falcon 900LX, News Release, 2012, 1 page.

Rockwell Collins, Jet Aviation St. Louis to install Rockwell Collins' Venue HD cabin system on a Global Express, News Release, 2012, 2 pages.

Rockwell Collins, Airshow 4000, retrieved on Oct. 4, 2013, retrieved from http://www.rockwellcollins.com/sirecore/content/Data/Products/Cabin/Moving_Map_system, 2 pages.

Rockwell Collins, Airshow App for Mobile Devices, 2012, 4 pages.

Rockwell Collins, Airshow 4000 Version 2, 2013, 9 pages.

* cited by examiner

SDR

Administrator

CONNECTION OVERVIEW

| Network | Status | Actions |
|---|---|---|
| LAN  | Online for : 1h 2m 33s<br>IP: 123.456.78 1/24<br>RX: 12.33 MB<br>TX: 27.89 MB | |
| 3G  | Online for : 4h 55m 6s<br>IP: 12.34.5 18/32<br>RX: 7.75 MB<br>TX: 2.01 MB | Disconnect  Edit  Delete |
| GOIP  | Online for : 0h 0m 0s<br>IP: 10.202.200 79/32<br>Status: Connected<br>Via: 3G<br>RX: 7.23 MB<br>TX: 1.23 MB | Disconnect  Edit  Delete |
| SwiftBroadband  | | Connect  Edit  Delete |

ADD NEW LINK

ROUTER FOR AIRCRAFT COMMUNICATIONS WITH SIMULTANEOUS SATELLITE CONNECTIONS

CROSS REFERENCE TO RELATED APPLICATIONS

This application claims the benefit of priority to U.S. Provisional Patent Application Nos. 61/892,672 filed on Oct. 18, 2013, 61/888,574 filed on Oct. 9, 2013; 61/888,593 filed on Oct. 9, 2013; and 61/889,183 filed on Oct. 10, 2013. The entire disclosure of each of the applications listed in this paragraph are incorporated herein by specific reference thereto.

FIELD OF THE INVENTION

This invention relates to aircraft communication and, in particular, to methods, systems, routers and devices for providing a Satcom Direct Router for users to manage cabin communications systems onboard the aircraft including simultaneous connection use of Cellular, Inmarsat Swift 64, SwiftBroadband, Ku-Band, and Ka-Band satellite connections with intelligent traffic control.

BACKGROUND AND PRIOR ART

If a satellite is placed in synchronous orbit above the equator to revolve in the same direction of the earth's rotation and synchronized with the earth's rotation, the satellite will continually remain above a fixed point on the surface of the earth. Many communications satellites have been placed in these synchronous orbits to provide continuous communications capabilities in almost all regions of the globe.

Generally, active communications satellites are orbiting repeaters with broadband characteristics. A signal from a ground station is intercepted by the satellite, converted to another frequency, and retransmitted at a moderate power level to an end user receiver. This provides much better signal strength at the receiving end of the circuit as compared with a signal that is merely reflected from a passive satellite. Active communications satellites are placed in synchronous orbits, making it possible to use them with fixed antennas, a moderate level of transmitter power, and at any time of the day or night. Synchronous satellites are used for television and radio broadcasting, communications, weather forecasting, and military operations.

Further, a constellation of satellite systems such as INMARSAT® is used to cover major regions of the globe to enable ground-to-aircraft (and aircraft-to-ground) communications via the satellite systems. One example of such a constellation is INMARSAT I4, which currently comprises three satellites located in geostationary orbits, each generally covering a region of approximately one-third of the globe with a certain amount of overlap between regions. These satellites are used to provide circuit switched and packet switched data connection as well as additional services, such as Broadband Global Area Network (BGAN) and Swift Broadband (SBB).

INMARSAT®, ViaSat, Intelsat and Eutelsat satellites support various different types of communications services to the aeronautical, maritime and land mobile markets. An airborne satellite communication system can provide an aircraft with multiple digital voice, fax, and real-time Internet communications capabilities. These systems are specifically adapted for use in global two-way, ground-to-air communications by aircraft operators requiring global voice, fax, and Internet communications for their flight crews and passengers.

As the general communications need to transmit more data in larger files at faster speeds grows, so too does the need for faster connections and increased data throughput. This holds true for any communications system, whether strictly ground-based, air-to-ground, or ground-to-air. One way developers of ground-based systems have addressed this need is through the use of acceleration and compression technologies. Acceleration and compression can be achieved through any number of techniques to reduce data traffic volumes such as selective caching, vertical data analysis, adaptive packet compression, packet aggregation and flow control, and so on. This ground-based technology contributes to increasingly faster connection speeds.

The same need for high-speed data connections that currently exist in the office or at home also exist in aircraft cabins. However, ground stations that support global two-way, air-to-ground ATG and ground-to-air GTA communications have not offered equivalent increases in data rates, and especially not in a cost-effective way.

U.S. Pat. No. 7,660,579 titled Communication network acceleration system and method issued Feb. 9, 2010 describes mobile ground-to-air and air-to-ground communication network acceleration that reduced the cost of airborne communication services by creating a faster connection and increasing data throughput. In one embodiment, the communication network acceleration system and method provide as much as a four-fold increase over standard high-speed data rates. This increase is made possible in part through the integration, implementation, and use of acceleration and compression technologies in the ground system that supports communications to and from an airborne terminal.

U.S. Pat. No. 7,761,793 titled SATCOM data compression system and method issued on Jul. 20, 2010 discloses a method of data compression for compressing a web page with graphics files, text files, JAVA scripts, and HTML files comprises storing the graphics files, the text files, the JAVA scripts, and the HTML files in a temporary directory. The graphics files are sorted into lossless and lossy file groups. The files are concatenated and then compressed to yield a compressed web page. Optimal file concatenation size range is determined to optimally develop compression performance while minimizing latency. The concatenated file size is regulated to the optimal file concatenation size.

In business aviation, connectivity is key. With the availability of several Satcom or air-to-ground systems, many business aircraft are being equipped with two or more such systems. With different voice and data communication paths off the aircraft, a confusing array of options is now available for passengers and operators to configure, manage and operate.

Thus, the need exists for solutions to the above problems with the prior art with a Satcom Direct router as a single line-replaceable unit to act as the communications hub for all aircraft links—voice or data.

SUMMARY OF THE INVENTION

A primary objective of the present invention is to provide methods, systems, routers and devices for an avionics router that allows simultaneous use of Inmarsat, SwiftBroadband, Swift 64, Ku-Band and Ka-Band satellite connections with the ability to deterministically forward data communications over one or more of the communication links based on preset policies.

A second objective of the present invention is to provide methods, systems, routers and devices for an avionics router that provides 8 Gigabit Ethernet Interfaces that supports 10/100/1000 mbps Ethernet networking where each port can be a WAN or LAN port, and integrates multiple satellite networks and satellite terminals A third objective of the present invention is to provide methods, systems, routers and devices for an avionics router that provides Wi-Fi-802.11b/n/g (Dual Band 2.4 GHz+5.0 GHz) for high speed up to approximately 150 Mbps Wi-Fi connectivity while onboard and provides 3G/4G cellular connectivity for high speed data while the aircraft is on the ground to facilitate software updates, remote troubleshooting and data reporting.

A fourth objective of the present invention is to provide methods, systems, routers and devices for an avionics router that uses advanced QoS/Prioritization to allocate bandwidth per device or person, prevents a single device from consuming all available bandwidth as well as prioritizing traffic for a VVIP.

A fifth objective of the present invention is to provide methods, systems, routers and devices for an avionics router that uses next generation acceleration/compression technology including advanced data caching.

A sixth objective of the present invention is to provide methods, systems, routers and devices for an avionics router that includes positioning reporting using A429 data, reports current position and/or other details to Satcom Direct Flight Tracker, real-time remote management & diagnostics, and local status reporting for onboard Apps/devices.

A first embodiment provides an onboard network router for aviation customers to manage voice and data cabin communications onboard an aircraft that includes a processing device connected with memory, a communication link to simultaneously use two or more satellite connections with in orbit communication satellites while the aircraft is in flight, a set of instructions for traffic control stored in the memory and executable by the processing device to manage cabin communication systems onboard the aircraft, plural Ethernet interfaces each configurable as one of a WAN port and a LAN port, and an ISDN interface and two or more simultaneous network interfaces to allow multiple avionic systems to operate on the aircraft. The satellite communication link allows simultaneous use of one or more of Inmarsat Swiftbroadband, Swift64, Ku-Band, and Ka-Band satellite connections.

The intelligent traffic control set of instructions includes a first subset of instruction for optimizing data transmission using one or more of data acceleration, data compression and data caching, and a second subset of instruction for bandwidth allocation; and can include a priority set of instructions configurable by the user for prioritizing traffic, a data packet routed according to the user configured policy.

The cellular network connectivity includes a Wi-Fi access port for WiFi network connectivity on the aircraft and a 3G/4G port for cellular network connectivity when the aircraft is on the ground. The Wi-Fi access port can be an 802.11n Dual-Band WiFi connection that is backward compatible with 802.11b/g to support two or more different radio frequencies to reduce interference. The plural Ethernet interfaces can include eight individual gigabit Ethernet ports and the onboard network router can include four or more discrete inputs and four or more discrete outputs.

The onboard network router includes a Satcom Direct configuration module with a Subscriber Identity Module card and a data plan for domestic and global roaming through the use of the configuration module and Subscriber Identity Module card and can include a globally unique configuration key for each router installed on the aircraft to activate one or more aircraft services.

The onboard network router can include a mobile application downloadable to a mobile communication device for using one or more onboard cabin services selected from a group consisting of moving map, flight tracker, command and control of satellite links and real-time connection status reporting.

The onboard network router can include an interface to integrate the onboard network router with an avionic Aero X module to provide acceleration, compression, optimization and caching of the two or more satellite connections; and or an ARINC 429 data port for position reporting and avionics monitoring.

A second embodiment provides a method for managing cabin communication onboard an aircraft by installing a Satcom Direct router to manage cabin communication system onboard the aircraft including simultaneous use of multiple satellite connections, multiple gigabit Ethernet ports and support multiple simultaneous wireless networks, and providing a downloadable Satcom Direct router mobile App to provide on-board cabin services including one or more of moving maps, flight tracker and command and control of satellite links. The method can include simultaneously using one or more of Inmarsat, SwiftBroadband, Swift 64, Ka-Band and Ku-band satellite connections.

The Satcom Direct router installation includes providing an 802.11n dual-band Wi-Fi port backward-compatible with 802.11b/g and providing 3G/4G network connectivity for remote avionic equipment support and Internet access when the aircraft is on the ground. Installation can include interfacing with a Satcom Direct Aero XR® to provide acceleration, compression, optimization and caching of multiple satellite links and or providing an ARINC 429 interface for one or more of location services and avionics monitoring.

The cabin communication management method can include activating one or more optional flex keys to activate one or more of Aero XR® to accelerate data transfer rates, moving maps and Flight tracking, Aero V for voice over IP, Sky Shield, Sky Ticket, and remote aeronautic equipment maintenance access. Installation can include integrating the Satcom Direct router with one or more Satcom Direct services selected from a group consisting of: AeroV®, SD Flight Tracker, SkyTicket, SkyShield and Aero X®.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 2:
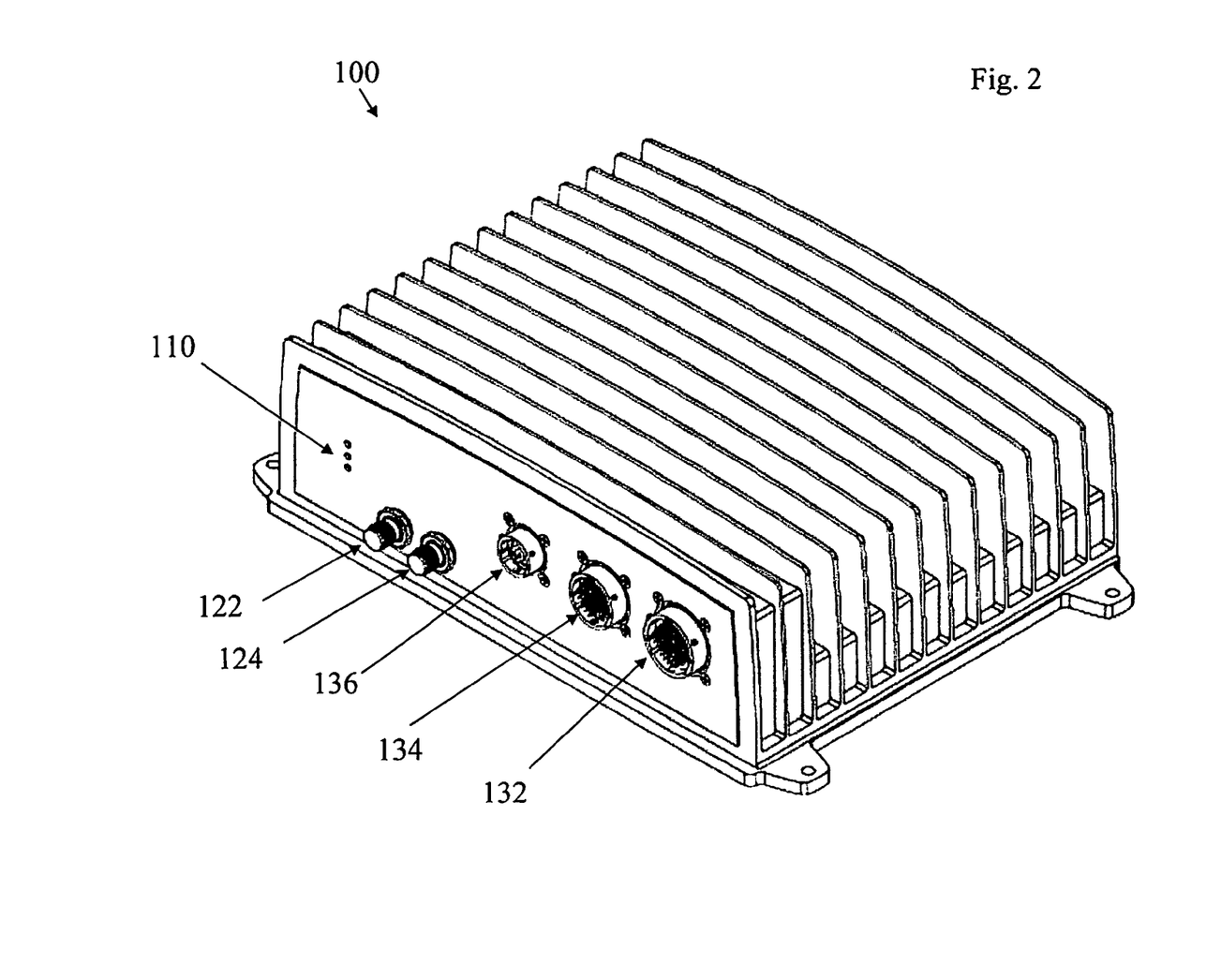
FIG. 2 is a perspective view of a Satcom Direct router according to the present invention.
Figure 3:
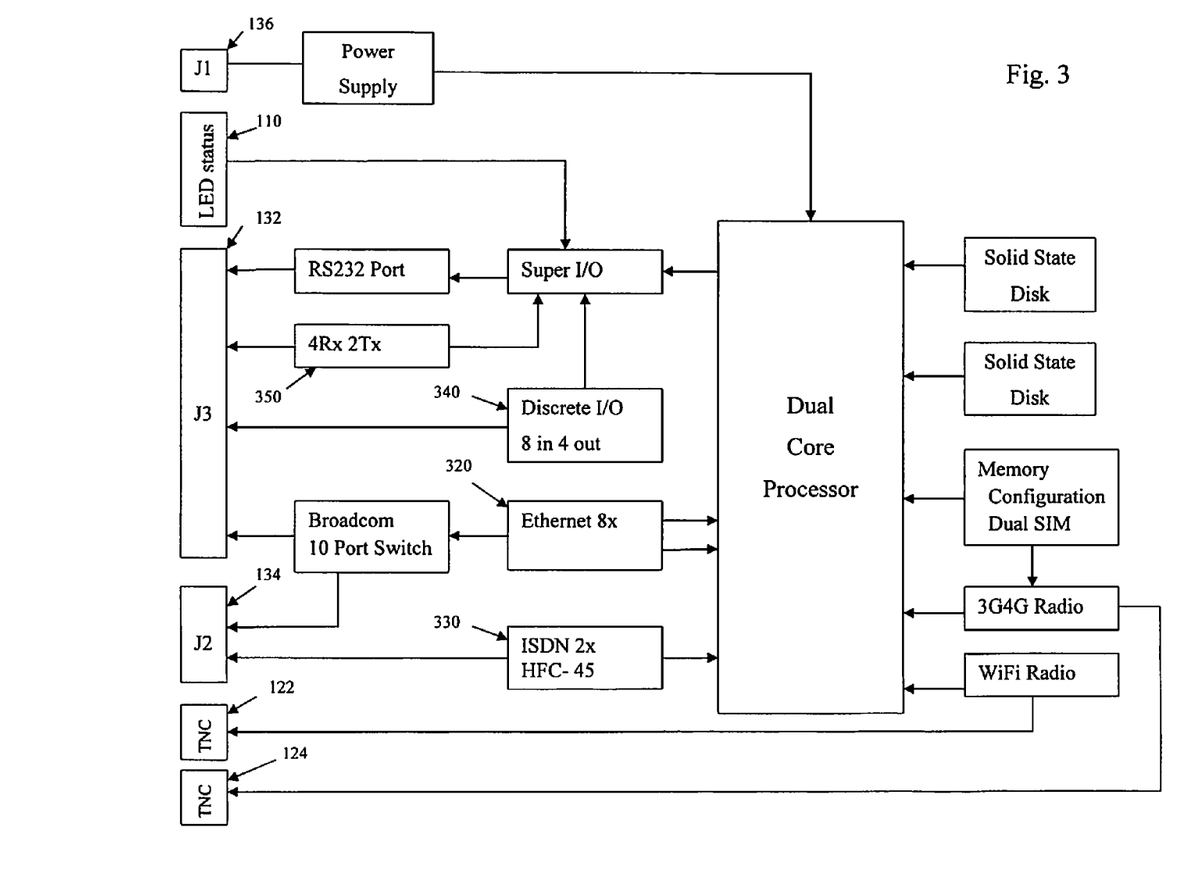
FIG. 3 is a schematic block diagram of the Satcom Direct router.
Figure 4:
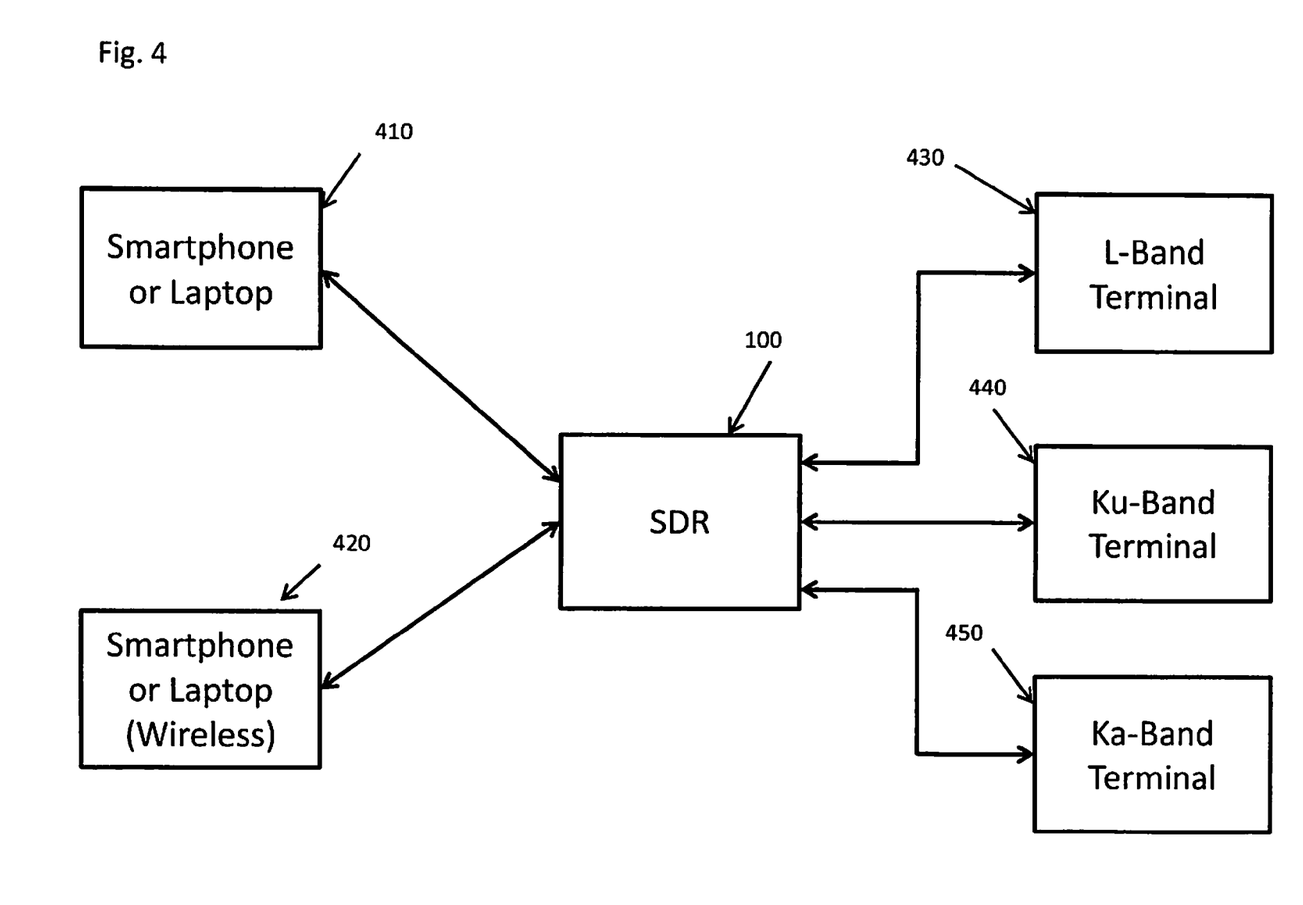
FIG. 4 is a schematic block diagram showing an example of Satcom Direct router communication links.

A list of components will now be described.
100 Satcom Direct router (SDR)
110 status indicators
122 TNC connector
124 TNC connector
132 power connector
134 data connector
136 data connector
320 Ethernet ports
330 ISDN ports
340 Discrete I/O
350 Arinc 429 Tx/Rx ports
410 Smartphone or laptop
420 Smartphone or laptop wireless
430 L-band terminal
440 Ku-band terminal
450 Ka-band terminal The term space craft covers both fixed wing and rotary aircraft, such as but not limited to private jets and commercial jets, helicopters and small aircraft flying within normal aircraft ranges, as well as outer-space craft for orbiting the earth or traveling outside the earth. Communication between space craft and ground stations is via satellite or other RF based connectivity.

The Satcom Direct Router (SDR) methods, systems, and devices incorporate various products described in U.S. Provisional Patent Applications, each assigned to Satcom Direct, Inc. the same assignee as this patent application. Specifically, the SDR incorporates the following inventions which are all incorporated by reference in their entirety:

U.S. Provisional Patent Application No. 61/889,183 filed on Oct. 10, 2013, by the same inventor and assignee of the subject invention, describes system and method for mobile ground-to-air and air-to-ground communication network acceleration. The system and method can reduce the cost of airborne communication services by creating a faster connection and thus increasing data throughput. In one embodiment, the communication network acceleration system and method provide as much as a four-fold increase over standard high-speed data rates. This increase is made possible in part through the integration, implementation, and use of acceleration and compression technologies in the ground system that supports communications to and from an airborne terminal.

U.S. Provisional Patent Application No. 61/888,574 filed on Oct. 9, 2013, by the same inventor and assignee of the subject invention, describes methods and systems for use of a centrally managed, 'Cloud' based system that is responsible for management on onboard avionics equipment. Specifically, this invention relates to a system whereby an avionics device will communicate with a centrally location "Cloud" system for command and control of both predefined and arbitrary tasks or functions that the onboard avionics will perform.

U.S. Provisional Patent Application No. 61/888,593 filed Oct. 9, 2013, by the same inventor and assignee of the subject invention, describes methods and systems that can manage multiple different connection types for Air-to-Ground and Ground-to-Air communications. This system actively monitors the different connections types, and switches traffic to the highest priority functioning connection. Furthermore, it does this while maintaining the connections of Internet TCP/IP traffic that is passing through the system, allowing passenger or system traffic to remain connected.

U.S. Provisional Patent Application No. 61/888,600 filed Oct. 9, 2013, by the same inventor and assignee of the subject invention, describes a capability which requires aircraft passengers who wish to use Internet Access while onboard on aircraft to watch a mandatory safety briefing video prior to being granted Internet access. During the use of personal electronics devices PED onboard an aircraft, the PEDS connect to an onboard wireless access point (WiFi). Either through onboard avionics equipment, or through a centrally managed ground based infrastructure, the passenger is required to watch a safety briefing video, with our without additional commercial or educations messages, before the PED is allowed access to the Internet. This is similar to many 'WiFi Hotspots' whereby the owner/operations of such require the viewing of advertisement or other communication content prior to being granted Internet access.

Figure 1:
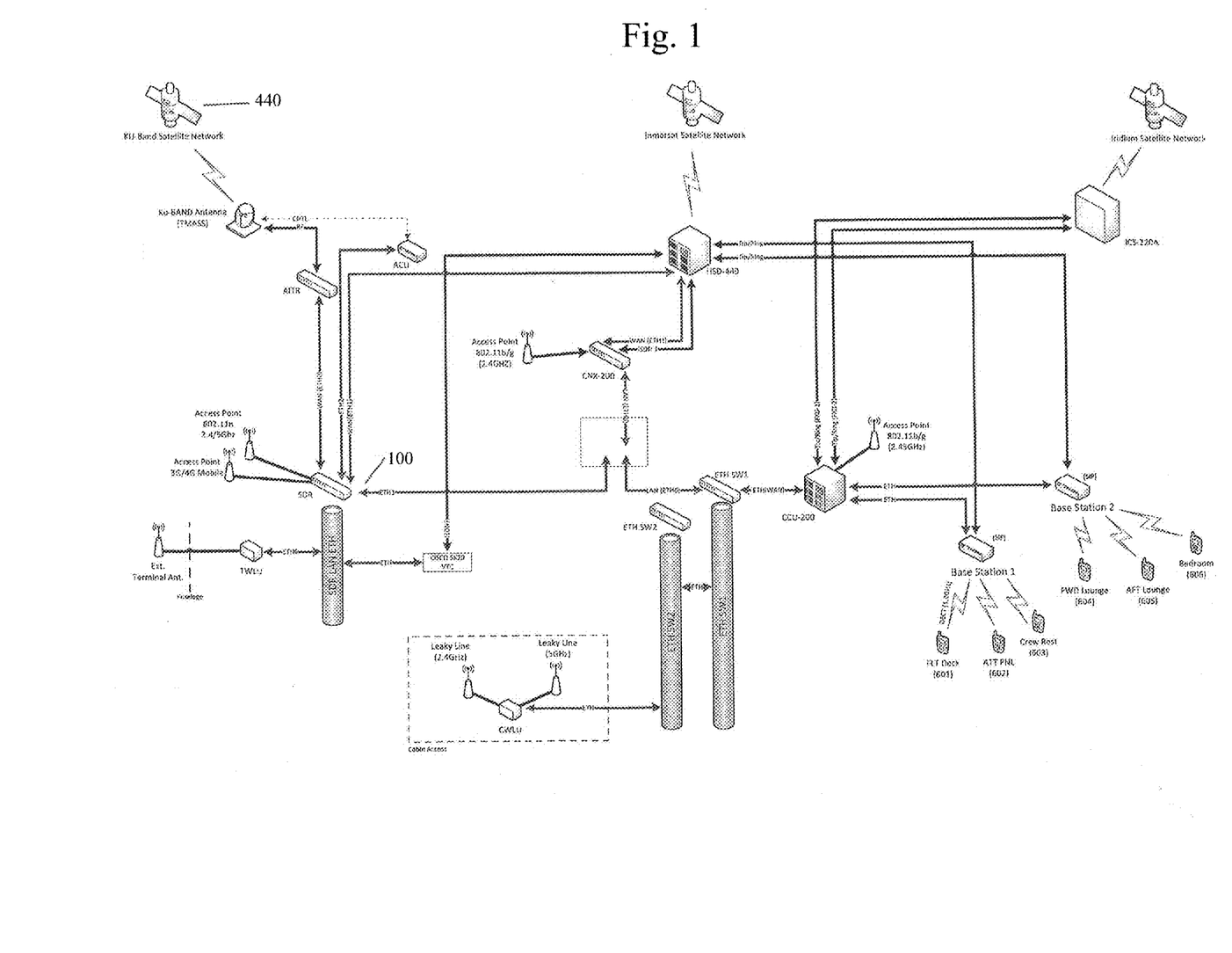
FIG. 1 is a system block diagram showing an example of the Satcom Direct router connected with a variety of different communication links.

The Satcom Direct Router SDR of the present invention simplifies management of multiple satcom links and networks on aircraft and integrates Satcom Direct services with the SDR router that enables business and military aviation customer to manage all cabin communication systems onboard the aircraft and to simultaneously use multiple different satellite connections. The SDR includes intelligent traffic control and allows simultaneous use of Inmarsat, Swift Broadband, Swift 64, L-band, Ka-band, and Ku-band satellite connections as shown in FIG. 1. Minimally, the accelerated system includes a Satcom Direct router 100, at least one mobile aircraft-based communication system, a ground-based communication system and a satellite communication system.

The mobile aircraft-based communication system is adapted to transmit and receive accelerated, compressed (when possible) data signals and includes a data communication accelerator adapted to accelerate and decelerate data signals received by the mobile aircraft-based communication system. Furthermore, once the data has been transmitted or received, it may then be cached—stored locally on the data router accelerator; so future requests for the same data block do not to be retransmitted.

The ground-based communication system is adapted to transmit and receive accelerated and optionally compressed data signals and comprises a data communication router adapted to route accelerated and non-accelerated data signals as described in the '183 patent application. The data communication router device also caches data as required, and keeps track of data that has been transmitted to the aircraft based data communications accelerator, so that it can indicate that cached data stored on the aircraft based data communications accelerator may be reused instead of retransmitting the data.

An airborne satellite communication system provides an aircraft with multiple digital voice, fax, and real-time Internet communications capabilities. These systems are specifically adapted for use in global two-way, ground-to-air and air-to-ground communications by aircraft operators requiring global voice, fax, and Internet communications for their flight crews and passengers.

The combination of the aircraft data communications accelerator and the ground based data router provide a combination of data acceleration, compression and data caching, increasing the performance of the aircraft-to-ground and ground-to-aircraft communications.

The Satcom Direct router also provides real time status updates and position reports between the aircraft and a terrestrial network. In other words, the invention also relates to a specific query function which identifies the specific aircraft and enables direct location as well as other cabin status features between ground equipment and the aircraft.

FIG. 2 is a perspective view of a Satcom Direct router 100 according to the present invention and FIG. 3 is a schematic block diagram of the Satcom Direct router of FIG. 2. As shown, the Satcom Direct router includes status indicators 110, data connectors 32 and 134, power connector 136, and two TNC antenna connectors 122 and 124 for Wi-Fi and 3G/4G network connectivity.

The indicators can be variable color LEDs that illuminate red, orange or green. In one example, one of the indicators shows the overall status of the router where red illumination indicates a fault, orange indicates that the router is booting or that a software update is in progress and green indicates that the router is operating properly. Another indicator can be used to indicate that the router is accelerating data transmission. In this example, green can be used to indicate acceleration and off can show non-acceleration. Yet another indicator can be used to show when one or more WAN links are up or that no WAN connections are active.

The Satcom Direct router addresses the problem of disparate connection speeds between ground-based and ground-to-air based communication systems by increasing the effective network capacity of ground-to-air and air-to-ground communication systems. The Satcom Direct router integrates with Satcom Direct services, including AERO V® (Satcom Directs voice over Internet Protocol for aviation), SD Flight Tracker (Satcom Direct Flight Tracker) provides global flight tracking, SkyTicket (to bill selected passengers for data consumed in-flight), SkyShield (Satcom Direct's SkyShield allows a user to control in-flight Internet usage by blocking unneeded processes that slow down connection and increase data costs) and AERO XR®. AERO XR is Satcom Direct's next-generation Aero X® service described in the '183 provisional patent application, which allows acceleration, compression and optimization of multiple satellite links and provides data caching over any satellite network.

The Satcom Direct router is compatible with most existing Wi-Fi access points and includes 802.11n dual band (2.4+5.0 GHz) Wi-Fi and is backward compatible with 803.11b/g. Four or more simultaneous wireless networks are supported to allow multiple systems to operate on the aircraft without additional wireless access points. This allows for separate guest or dedicated VVIP networks. While the aircraft is on the ground, 3G/4G network connectivity is available through the Satcom Direct router. For domestic and global roaming, Satcom Direct® offers data plans for global roaming through the use of the SDR's Dual-SIM module so customers can have the best roaming rates around the world.

As shown in FIG. 3, the dual core processor based Satcom Direct router is configured with eight gigabit Ethernet ports 320, two ISDN ports 330, two Arinc 429 transmit ports and four receive ports 350, eight discrete inputs and four discreet outputs 340, a Wi-Fi port, and a 3G/4G/LTE port. FIG. 4 is a block diagram showing communication links between smart phones or laptops 410 and wireless smart phones or laptops 420 and L-band 430, Ku-band 440 and Ka-band 450 terminals and the Satcom Direct router. Satcom Direct router proprietary mobile apps can be downloaded from an App store. The apps can include on-board cabin services such as moving map, Satcom Direct Flight Tracker, command and control of satellite links, plus real-time connection status reporting.

Satcom Direct router of the present invention incorporates acceleration, compression and optimization of multiple satellite links and provides data caching over any satellite network as described in U.S. Provisional Patent Application No. 61/889,183 filed on Oct. 10, 2013. The Satcom Direct router with acceleration, compression, optimization and data caching provides the customer with state of the art ground-to-air and air-to-ground communications. Frequently accessed data streams can be stored in a cache memory at one or both the mobile aircraft communication device and the ground based communication system to decrease or eliminate the need for retransmitting duplicate data streams upon request.

Each aircraft can be provided with its own Internet protocol (IP) subnet such that the mobile aircraft-based and ground-based accelerators are able to recognize that the data stream is to be accelerated or decelerated, respectively. The accelerator uses a combination of compression and acceleration technologies to significantly increase the bandwidth of the communication network. This accelerated traffic from the aircraft is then transmitted by satellite to a ground-based communication station as shown in FIG. 1. The ground station recognizes that the traffic is accelerated, based upon the aircraft's IP address in one embodiment, and routes the traffic to ground-based system data communication accelerator where the traffic is subsequently decelerated. The decelerated traffic is then routed to a communication network, such as the Internet.

Similarly, for GTA traffic, data from the Internet or another source reaches the data communication accelerator at the ground-based system 200, the destination IP address of an aircraft is recognized as compatible with acceleration, and the data is accelerated. The accelerated data is transmitted by satellite to the aircraft, where the data is subsequently decelerated by the cabin network accelerator and sent to a data device, such as a computer, laptop, PDA, cell phone, or other data device.

Figure 5:
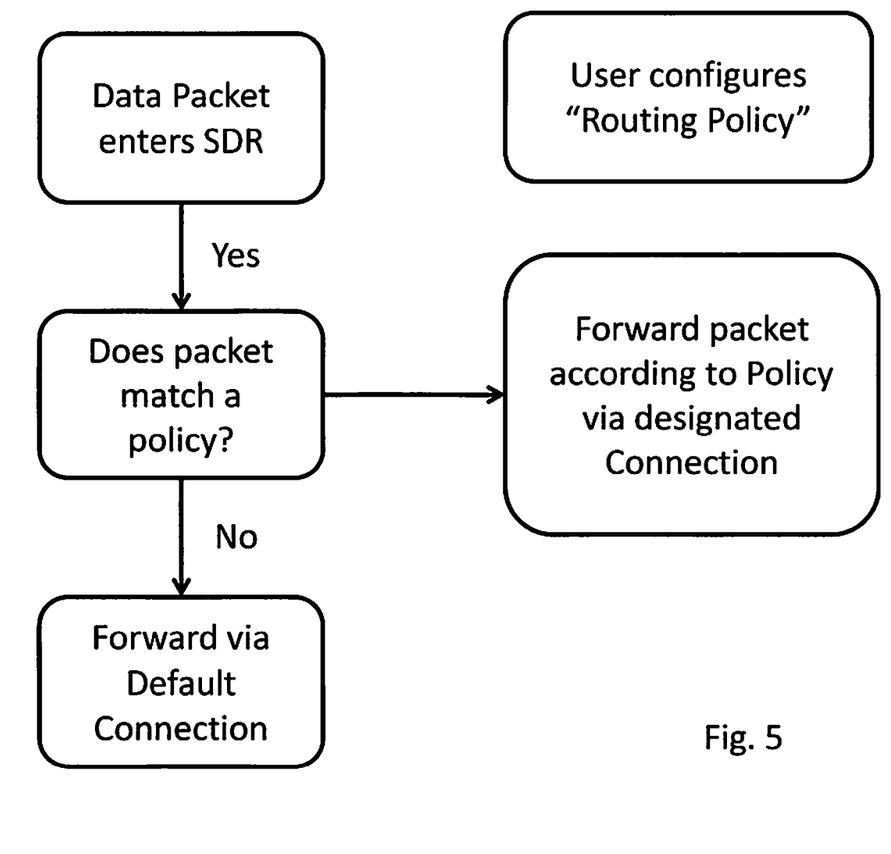
FIG. 5 is a process flow diagram showing the Satcom Direct router intelligent traffic control.

After the Satcom Direct router is installed, the user can define a set of policies to manage multiple links and networks. The user can define a set of policies for communication based on, for example, cost or performance or based on availability. The Satcom Direct router allows simultaneous use of Inmarsat, Swift Broadband, Swift 64, Ku-Band and Ka-Band satellite connections with the ability to deterministically forward data communications over one or more of the communication links based on preset policies. Additionally, the user can set policies for routing based on service, source or destination address, the ToS bit and the like and uses advanced QoS/Prioritization to allocate bandwidth per device or person to prevent a single device from consuming all available bandwidth as well as prioritizing traffic for a VVIP. FIG. 5 is a process flow diagram showing the Satcom Direct router intelligent traffic control.

FIG. 5 is a flow diagram showing the steps for intelligent traffic control after the user has defined policies for managing the multiple available links and networks. As shown, the data packet enters the Satcom Direct router and it is determined if the dta packet matches a policy. When the packet does match a policy, the packet is forwarded according to the policy via the designated connection. When the data packet does not match a policy, the packet is forwarded according to default connection.

Figure 6:
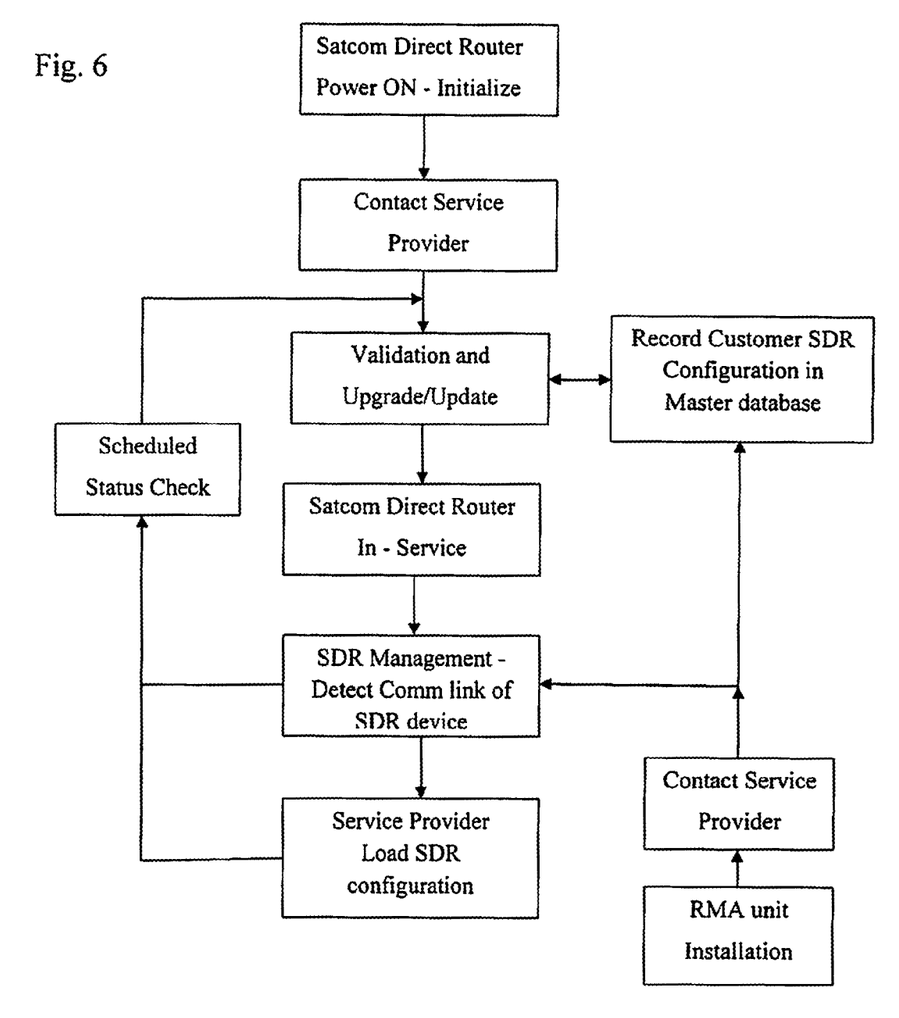
FIG. 6 is a flow diagram showing operational characteristics if the Satcom Direct router for aircraft communications.

FIG. 6 is a flow diagram showing operational characteristics of the Satcom Direct router. Operationally, each Satcom Direct router initiates a 'phone home' to Satcom Direct upon first-ever initial power-up and then every 30 days (or other periodic schedule), at which point Satcom Direct service provider can validate the Satcom Direct Router device configuration and update as required based on Satcom Direct's ground master database. The Satcom Direct router management software detects the communication links to the router and the service provider loads the Satcom Direct router configuration. If unit doesn't phone home periodically, every 30 days in this example, Satcom Direct flags the account and proactively contacts the customer to determine the status of the aircraft.

During operation, the router routinely completes scheduled status checks to validate the router and check for availability of upgrades and updates. When necessary, the service provider may be contacted to re-install the router configuration that is stored in the master database. When upgrades and or updates are downloaded to the router, the service provider is contact and the updated configuration is stored in the master database.

The Satcom Direct router can include a globally unique configuration key or keys, even if more than one SDR is installed on the same aircraft and can include plural different flex keys to activate one or more features or capabilities such as, but not limited to, compression/acceleration to accelerate data transfer rates, 3G/4G cellular service, Flight tracking, 3G SIM unlock, Global One IP, MyFlight mobile application with additional features when connected to SDR, Aero V VoIP service, Sky Shield for filtering of data communications, Sky Ticket for per device billing and access control, and remote maintenance access.

The Satcom Direct router of the present invention also provides for ground testing and troubleshooting when the communication equipment is powered and a laptop or similar device is connected to the router Wi-Fi or to a wired LAN port. The router graphical user interface displays "connection overview" information similar to the screen shot shown in FIG. 7. In the example shown, a LAN connection, 3G Wi-Fi and voice are online. For each active connection, the router displays the online time, the IP address assigned to the connection as well as transmit and receive speeds. The Satcom Direct router configuration can be saved to a PC for later use when it is necessary to restore the saved configuration.

Figure 7:
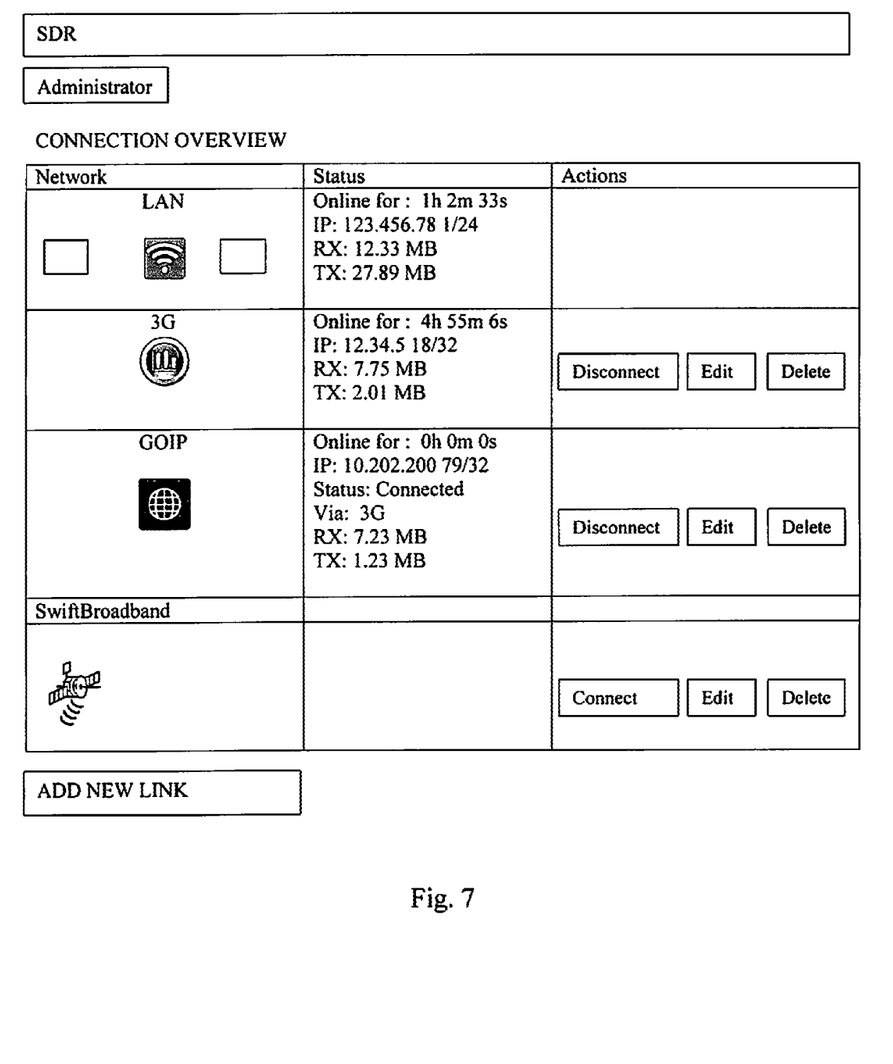
FIG. 7 shows an example of a screen shot for the SDR overview screen.
Figure 8:
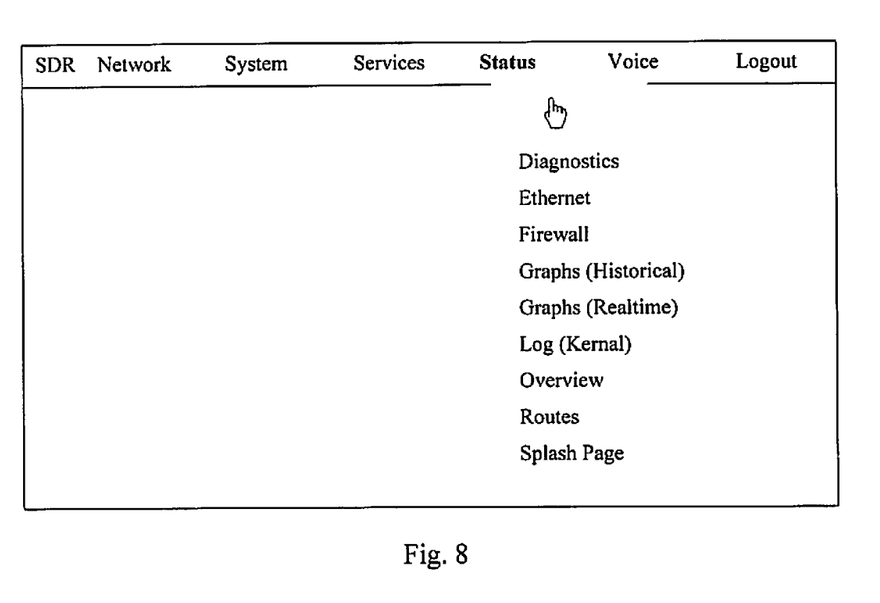
FIG. 8 show an example of a screen shot of the menu bar with status selected.

The user can select "Administrator" to enter the user name and password associated with the router to make changes to the connections as shown in FIG. 7. The user can verify from this screen that the wired satcom terminal interfaces are displayed and are properly configured. FIG. 8 shows an example of a screen shot of the tool bar with "status" selected. When Ethernet is selected, the screen displays the current status of the router's eight Ethernet interfaces such as whether the link is up or down. When the user selects "Network", the "Connection Overview" shown in FIG. 7 is displayed.

From the menu, when the user selected "Status" and "Diagnostics", then the user can "ping" the Satcom direct ground station and can select to check one or more of the satcom interfaces. When the console port of the router is wired to a maintenance port in the aircraft, maintenance can be performed with automatically or by running individual checks using assigned maintenance commands such as 'show isdn", 'show l-band', 'show version', or 'show aerovlogs' for example.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An onboard network router for aviation customers to manage voice and data cabin communications onboard an aircraft comprising:
   a processing device connected with memory;
   a communication link to simultaneously use two or more satellite connections with in orbit communication satellites while the aircraft is in flight;
   a set of instructions for traffic control stored in the memory and executable by the processing device to manage cabin communication systems onboard the aircraft;
   plural Ethernet interfaces each configurable as one of a WAN port and a LAN port; and
   an ISDN interface and two or more simultaneous network interfaces to allow multiple avionic systems to operate on the aircraft wherein the satellite communication link allows simultaneous use of two or more of Inmarsat, Swiftbroadband, Swift64, Ku-Band, and Ka-Band satellite connections to deterministically forward data communications over two or more of said communication links based on preset policies by a user
   said router including QoS/Prioritization to locate bandwidth per device or person and prevents a single device from consuming all available bandwidth as well as prioritizing traffic for a VVIP.

2. The onboard network router of claim 1, wherein the intelligent traffic control set of instructions comprises:

a first subset of instruction for optimizing data transmission using one or more of data acceleration, data compression and data caching; and a second subset of instruction for bandwidth allocation.

3. The onboard network router of claim 2, wherein the intelligent traffic control set of instructions further comprises:

a priority set of instructions configurable by the user for prioritizing traffic, a data packet routed according to the user configured policy.

4. The onboard network router of claim 1, wherein the cellular network connectivity comprises:

a Wi-Fi access port for WiFi network connectivity on the aircraft; and a 3G/4G port for cellular network connectivity when the aircraft is on the ground.

5. The onboard network router of claim 4 wherein the Wi-Fi access port comprises:

an 802.11n Dual-Band WiFi connection that is backward compatible with 802.11b/g to support two or more different radio frequencies to reduce interference.

6. The onboard network router of claim 1, wherein the plural Ethernet interfaces comprises:

eight individual gigabit Ethernet ports.

7. The onboard network router of claim 1 further comprising:

four or more discrete inputs and four or more discrete outputs.

8. The onboard network router of claim 1 further comprising:

a configuration module with a Subscriber Identity Module card; and a data plan for domestic and global roaming through the use of the configuration module and Subscriber Identity Module card.

9. The onboard network router of claim 1 further comprising:

a globally unique configuration key for each router installed on the aircraft to activate one or more aircraft services.

10. The onboard network router of claim 1, further comprising:

a mobile application downloadable to a mobile communication device for using one or more onboard cabin services selected from a group consisting of moving map, flight tracker, command and control of satellite links and real-time connection status reporting.

11. The onboard network router of claim 1, further comprising:

an interface to integrate the onboard network router with an avionic Aero X module to provide acceleration, compression, optimization and caching of the two or more satellite connections.

12. The onboard network router of claim 1 further comprising:

an ARINC 429 data port for position reporting and avionics monitoring.

13. The onboard network router of claim 1, wherein the satellite communication link allows simultaneous use of Inmarsat, Swiftbroadband, Swift64, Ku-Band, and Ka-Band satellite connections to deterministically forward data communications over two or more of said communication links based on preset policies by the user.

14. A method for managing cabin communication onboard an aircraft comprising the steps of:

installing a router to manage cabin communication system onboard the aircraft including simultaneous use of multiple satellite connections, multiple gigabit Ethernet ports and support multiple simultaneous wireless networks; and providing a downloadable router mobile App to provide on-board cabin services including one or more of moving maps, flight tracker and command and control of satellite links, wherein the satellite communication link allows simultaneous use of two or more of Inmarsat, Swiftbroadband, Swift64, Ku-Band, and Ka-Band satellite connections to deterministically forward data communications over two or more of said communication links based on preset policies by a user, said router including QoS/Prioritization to locate bandwidth per device or person and prevents a single device from consuming all available bandwidth as well as prioritizing traffic for a VVIP.

15. The cabin communication management method of claim 14 wherein the router installation step includes the steps of:

providing an 802.11n dual-band Wi-Fi port backward-compatible with 802.11b/g; and providing 3G/4G network connectivity for remote avionic equipment support and Internet access when the aircraft is on the ground.

16. The cabin communication management method of claim 14 wherein the router installation step includes the step of:

interfacing with a Satcom Direct Aero XR® to provide acceleration, compression, optimization and caching of multiple satellite links.

17. The cabin communication management method of claim 14 wherein the router installation step includes the steps of:

providing an ARINC 429 interface for one or more of location services and avionics monitoring.

18. The cabin communication management method of claim 14 further comprising the step of:

activating one or more optional flex keys to activate one or more of Aero X® to accelerate data transfer rates, moving maps and Flight tracking, Aero V for voice over IP, Sky Shield, Sky Ticket, and remote aeronautic equipment maintenance access.

19. The cabin communication management method of claim 14 wherein the router installation step includes the steps of:

integrating the router with two or more services selected from a group consisting of: AeroV®, SD Flight Tracker, SkyTicket, SkyShield and Aero XR®.

20. The cabin communication management method of claim 14, wherein the step of providing a downloadable the router mobile App step includes the step of:

allowing simultaneous use of Inmarsat, Swiftbroadband, Swift64, Ku-Band, and Ka-Band satellite connections to deterministically forward data communications over two or more of said communication links based on preset policies by the user.

* * * * *